United States Patent
Gillet et al.

(10) Patent No.: US 9,805,608 B2
(45) Date of Patent: Oct. 31, 2017

(54) METHOD AND A DEVICE FOR ASSISTING PILOTING IN ORDER TO DETECT AND SIGNAL LOCAL WEATHER RISKS ASSOCIATED WITH THE RELIEF OF THE TERRAIN OVERFLOWN BY AN AIRCRAFT

(71) Applicant: AIRBUS HELICOPTERS, Marignane (FR)

(72) Inventors: Marianne Gillet, Vitrolles (FR); Etienne Poudrai, Marseilles (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 15/161,842

(22) Filed: May 23, 2016

(65) Prior Publication Data
US 2016/0351059 A1    Dec. 1, 2016

(30) Foreign Application Priority Data
May 27, 2015    (FR) ...................................... 15 01088

(51) Int. Cl.
| G08G 5/00 | (2006.01) |
|---|---|
| G01C 23/00 | (2006.01) |
| G01S 19/42 | (2010.01) |
| G01W 1/10 | (2006.01) |
| G06F 17/30 | (2006.01) |

(52) U.S. Cl.
CPC ............ *G08G 5/0091* (2013.01); *G01C 23/00* (2013.01); *G01S 19/42* (2013.01); *G01W 1/10* (2013.01); *G06F 17/30* (2013.01); *G08G 5/0013* (2013.01); *G08G 5/0021* (2013.01);
(Continued)

(58) Field of Classification Search
CPC combination set(s) only.
See application file for complete search history.

(56) References Cited

U.S. PATENT DOCUMENTS

| 8,159,369 B1 | 4/2012 | Koenigs et al. |
| 9,558,672 B2 * | 1/2017 | McCann .............. G08G 5/0039 |

(Continued)

FOREIGN PATENT DOCUMENTS

| EP | 2696171 A2 | 2/2014 |
| EP | 2696171 A3 | 7/2014 |
| WO | 2014106268 | 7/2014 |

OTHER PUBLICATIONS

French Search Report for French Application No. FR 1501088, Completed by the French Patent Office on Mar. 15, 2016, 6 Pages.

*Primary Examiner* — Yonel Beaulieu
(74) *Attorney, Agent, or Firm* — Brooks Kushman P.C.

(57) ABSTRACT

A method having a step of preparing an on-board database containing various kinds of geographical data. During a step of preparing a risk database, at least one local weather risk is stored prior to flight for at least one mesh. During a weather determination step, current and/or forecast weather conditions are acquired for at least one mesh. During a processing step, at least one combined parameter is determined for at least one mesh, each value of a combined parameter being obtained by applying a logic function giving the value of the combined parameter for a mesh as a function of the geographical data and also of the weather risk and the meteorological data. During an analysis step, the presence of a potential local weather danger, at least around the aircraft, is detected in flight as a function of the combined parameter values.

20 Claims, 1 Drawing Sheet

(52) U.S. Cl.
CPC ......... *G08G 5/0052* (2013.01); *G08G 5/0086* (2013.01); *G01W 2203/00* (2013.01)

(56) References Cited

U.S. PATENT DOCUMENTS

| | | |
|---|---|---|
| 9,607,520 B2 * | 3/2017 | McCann .............. G08G 5/0039 |
| 2009/0248224 A1 * | 10/2009 | Tschannen ............. G01C 23/00 701/3 |
| 2010/0033499 A1 | 2/2010 | Gannon et al. |
| 2016/0356922 A1 * | 12/2016 | McCann ................ G01W 1/00 |

* cited by examiner

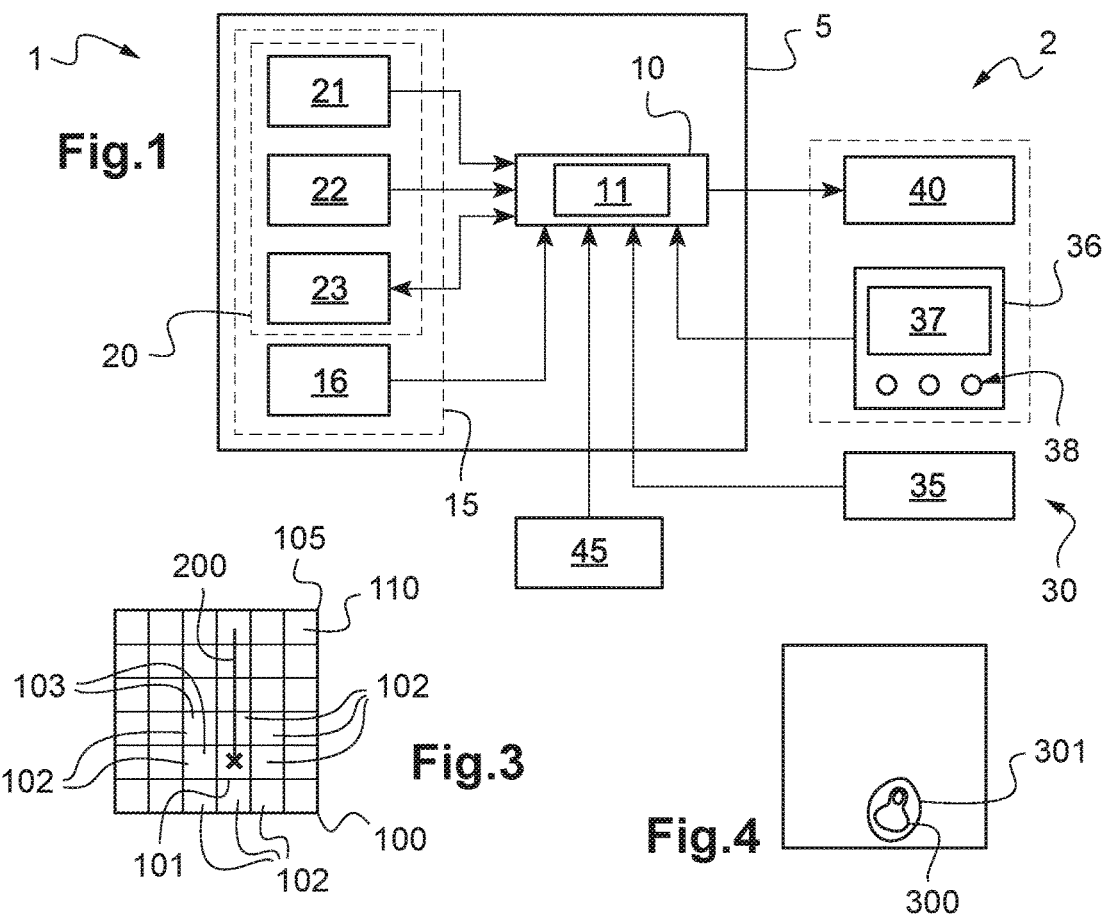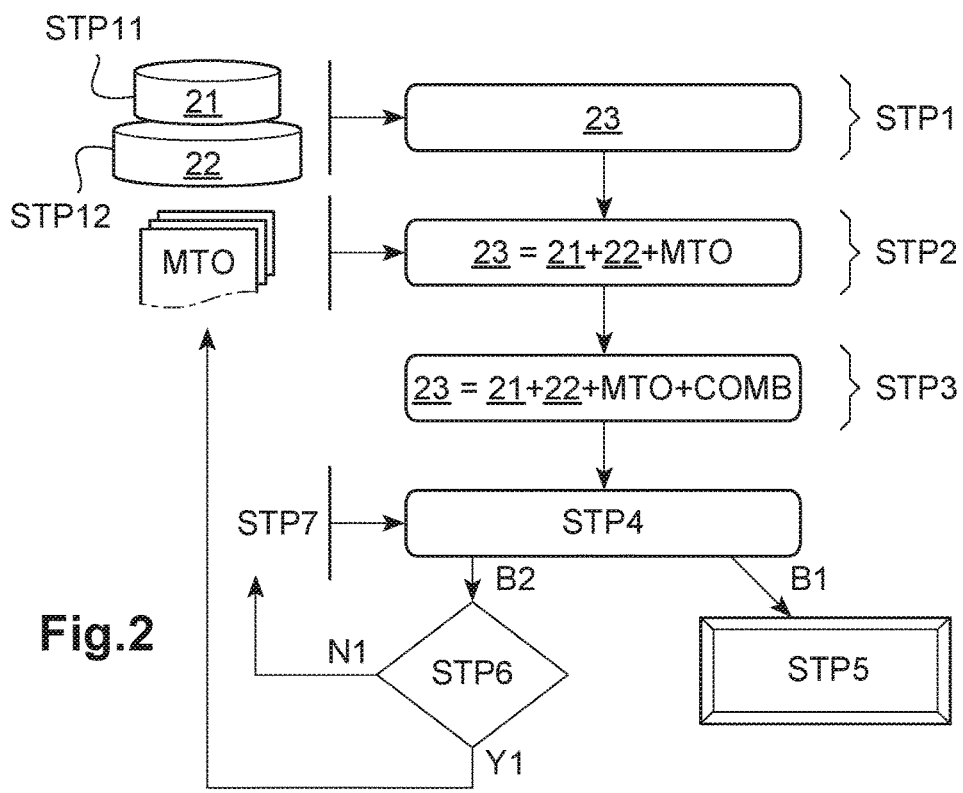

METHOD AND A DEVICE FOR ASSISTING PILOTING IN ORDER TO DETECT AND SIGNAL LOCAL WEATHER RISKS ASSOCIATED WITH THE RELIEF OF THE TERRAIN OVERFLOWN BY AN AIRCRAFT

CROSS REFERENCE TO RELATED APPLICATION

This application claims priority to French patent application No. FR 15 01088 filed on May 27, 2015, the disclosure of which is incorporated in its entirety by reference herein.

BACKGROUND OF THE INVENTION (1) Field of the Invention

The present invention relates to a method and to a device for assisting piloting in order to detect and signal local weather risks associated with the relief of the terrain overflown by an aircraft.

In particular, the invention relates to a method and a device for facilitating low altitude flight. The invention thus lies in the technical field of devices for assisting piloting at low altitude.

(2) Description of Related Art

In order to fly at low altitude, the relief of the terrain is a major element that needs to be taken into consideration. The topology and the nature of the terrain being overflown are stored in terrain databases.

For example, a terrain database may be in the form of a digital model of the elevation of the terrain being overflown, known as digital terrain elevation data (DTED®) by the person skilled in the art. Various types of digital model exist depending on their accuracy. Thus a level 1 DTED® uses a mesh with accuracy of three seconds of arc, i.e. about 100 meters (m), whereas a level 2 DTED® model uses accuracy of one second of arc, i.e. about 30 m.

Terrain databases may comprise information relating to the terrain. Terrain databases may also comprise information relating to obstacles present above the overflown terrain, such as cables or pylons, for example.

Under such circumstances, a pilot can use a navigation and management system that makes use of such a terrain database in order to establish a path to be followed while preparing a flight plan. In cruising flight, the path may be in the form of a plurality of segments, each segment being situated at a given height above the highest point of the overflown terrain.

Furthermore, the ability of an aircraft to perform a mission also depends on weather conditions. In order to evaluate these weather conditions, a pilot can thus rely on official meteorological information issued in the form of messages or maps, and the pilot can also rely on direct observations.

For example, one particular weather report for aviation is known by the acronym METAR which stands for meteorological aerodrome report or meteorological airport report. Other weather messages are known under the acronyms TAF, SPECI, and SIGMET.

The weather conditions transmitted using maps and messages are used manually by the crew and/or an air traffic controller and/or a mission preparer. The available weather observations and predictions enable the crew to decide whether to take off, to delay the flight, or to modify the initial flight plan.

The term "manually" means that the crew studies weather conditions without the assistance of any tool for providing assistance in decision taking.

The information transmitted to an aircraft is of interest but it does not take into consideration local modifications to weather that are associated with the relief of the terrain being overflown.

Document US 2010/0033499 is remote from the invention. That Document US 2010/0033499 describes a method and a device for avoiding pilot confusion when displaying multiple categories of data, in particular both meteorological data and terrain data.

Document WO 2014/106268 seeks to determine an alternative flight plan for an airplane as a function of data about atmospheric turbulence and icing.

These Documents US 2010/0033499 and WO 2014/106268 are therefore unrelated to local modifications to weather associated with the relief of the terrain being overflown.

Also known are Documents U.S. Pat. No. 8,159,369 and EP 2 696 171.

BRIEF SUMMARY OF THE INVENTION

The present invention thus seeks to propose a method for providing assistance in decision-making for the purpose of detecting and signaling local weather risks associated with the relief of the overflown terrain.

The invention thus provides a piloting assistance method for detecting and signaling local weather risks associated with the overflown terrain, the overflown terrain being subdivided in a geo-referenced grid that is provided with a plurality of individual meshes.

The term "geo-referenced grid" means that each mesh is associated with geographical coordinates. For example, each mesh is a square mesh having eight other square meshes around it.

The method comprises the following steps:

prior to flight, a step of preparing an on-board terrain database by storing in said terrain database a plurality of kinds of geographical data providing each mesh with the altitude of the terrain and providing at least one mesh with a nature of the terrain;

prior to flight, a step of preparing an on-board risk database by storing in the risk database at least one local weather risk for at least one mesh, each weather risk representing a local weather phenomenon that might occur as a function of geographical data of the corresponding mesh;

a weather determination step of acquiring official meteorological data relating to current and/or forecast weather conditions for at least one mesh;

a processing step, performed after the weather determination step, of determining a value of at least one "combined" parameter for at least one mesh, the combined parameter representing a potential modification of said weather conditions due to the terrain, each value of a combined parameter being obtained by applying a logic function giving said value of the combined parameter for a mesh as a function of said geographical data and also of said weather risks and said meteorological data associated with said mesh;

in flight, an analysis step of detecting the presence of a potential local weather danger at least around the aircraft as a function of said values of the combined parameters; and a signaling step of displaying information relating to a local weather danger detected during the analysis step.

In innovative manner, this method proposes taking account in combination of information both about the geography of the terrain and also about weather conditions for the purpose of detecting a potential weather danger that is present locally, which information is usually present on board an aircraft.

With this method, a terrain database is prepared. The terrain database may be in the form of a conventional digital terrain model. The digital model represents the terrain in the form of a plurality of meshes. For each mesh, the terrain database has the geographical coordinates of the meshes, the altitude of the mesh, and the nature of the terrain in the mesh.

The nature of the terrain represents the type of element present on the ground in the mesh.

Furthermore, an innovative risk database is prepared.

In addition, the meteorological data relating to weather conditions is said to be "official" because it is prepared by the usual weather forecasting bodies, such as Météo France in France.

The Applicant has observed that the weather conditions conventionally transmitted to an aircraft are determined generally, e.g. for a region. However, in a small geographical area, these weather conditions may be modified locally because of specific features of the terrain. Certain weather phenomena can thus arise or be amplified by the relief of the terrain and/or by the nature of the terrain.

By way of illustration, weather forecasting bodies may forecast high air humidity. This weather condition is transmitted to an aircraft. However, when air humidity is high, the approaches to areas of water or forests run the risk of being engulfed in fog.

Likewise, weather forecast bodies may forecast a strong wind. Nevertheless, a hill or a mountain then runs the risk of generating turbulence locally on a slope that is exposed to the wind and also at the summit, over a height that is equivalent to one-third of the height of the hill or the mountain, for example.

The invention seeks to detect and signal the risks of such local phenomena that are not mentioned by the usual weather forecasting bodies. Under such circumstances, the risk database contains the local weather risks that might occur because of the particular geography in certain locations. For at least one mesh, the database thus contains the local phenomena that might occur.

By way of example, the data in this risk database may be acquired and provided by an operator on the basis of experience and knowledge of the terrain, or by a body responsible for the environment, for example. The risk database is thus prepared by users who are local to a site, and it thus incorporates the history of weather phenomena that have occurred at that site.

For each mesh, the risk database may possibly evaluate the potential for each weather risk under consideration to appear.

During a flight, general weather conditions are transmitted to the aircraft by the usual means. The weather forecasting bodies deliver weather information for a given large geographical area, without taking account of the topology of the terrain. Conversely, the risk database identifies the weather risks for facilitating low altitude flights by providing additional local weather risk information using a terrain mesh that is finer than that used for the data transmitted by weather forecasting bodies.

Nevertheless, the risk database is limited to providing a list of local weather risks that might occur.

Under such circumstances, during the processing step, the method of the invention proposes evaluating whether each identified weather risk is likely to be present at a current instant or in the short term.

For at least one mesh, the value of a combined parameter is evaluated by applying a logic function on the basis both of transmitted weather conditions and also of the risks that might occur. Depending on the value of the combined parameter, the invention makes it possible to signal when the associated weather phenomenon is likely to be encountered by the aircraft.

Thus, for at least one mesh, at least one combined parameter is defined by a function based on a logic function, having inputs that are the geographical data of the mesh and also weather risks, both those that are intrinsic to the site of the mesh, and those that come from the conventionally transmitted immediate or forecast weather conditions.

This parameter is said to be a "combined" parameter because it depends both on general weather conditions and on the topology of the site in application of the following relationships:

$$\text{Combined parameter}[M] = f_{logic}(\text{geography}[M], \text{intrinsic risk}[M], \text{weather}[M])$$

where "M" represents a given mesh, "$f_{logic}$" represents the logic function that is applied, "geography [M]" represents the geographical data of the mesh M, "intrinsic risk[M]" represents the weather risk of the mesh M, and where "weather[M]" represents weather conditions at the mesh M.

This proposal also has the advantage of making "vertical contour" flight safe by defining a margin for passing over terrain and obstacles not only as a function of relief but also as a function of local weather. By way of example, the teaching of Document FR 2 947 370 may be applied when determining the setpoint height as a function of the values of the combined parameters.

The intended method thus enables a helicopter pilot, for example, to have available at all instants knowledge about the weather as refined locally by interaction between geography and the weather.

The method then automatically combines weather conditions with geographical data in order to specify the weather local to a site.

During the analysis step, the values of the combined parameters are used for detecting the presence of a potential local weather danger at least in the proximity of the aircraft, i.e. where the aircraft is located or on the path being followed by the aircraft. The signaling step serves to inform, e.g. a pilot, about the presence of such local weather dangers.

The method thus gives the pilot more accurate local knowledge about weather conditions, thus possibly enabling the pilot to prepare a better flight plan, to take more appropriate margins relative to terrain in relief, to select a breakthrough point more quickly, and possibly to anticipate a change of flight plan. This knowledge facilitates low altitude flight, which is likely to be disturbed by local weather phenomena that are not mentioned in the usual messages.

For example, if such weather dangers are identified the path may be modified to present wider margins relative to relief that is to be overflown.

Furthermore, during a step of preparing the signaling step, the parameters necessary for presenting a detected local weather danger are prepared. These parameters are referred to as "display" parameters in order to distinguish them from the "combined" parameters.

During a display step, a display step receives these display parameters in order to show a pilot a detected local weather danger.

For example, the display system presents a horizontal map background having "combined weather" zones superposed thereon relating to detected local weather dangers. The perimeter of a combined weather zone stems directly from the meshes of the terrain for which the combined parameters provide combined weather and geography information signaling a potential weather phenomenon that could be limiting on the flight of the aircraft.

This presentation may be associated with the terrain relief being shown in a section view, likewise having combined weather zones superposed thereon.

The method may also include one or more of the following characteristics.

For example, said risk database may be shared between a plurality of users in order to be enriched by said users.

The risk database is thus a collaborative database that can be updated by multiple feedback from experience.

Furthermore, the nature of the terrain represents the type of ground constituting the terrain. The nature may then be selected from a list comprising at least one of the following natures: urban, asphalt, countryside, forest, sand, water, rock.

Likewise, each weather risk may be selected from a list of phenomena comprising at least: a fog risk; a risk of air laden with solid particles; a risk of ground frost; and a risk of atmospheric turbulence.

In addition, each weather risk is optionally associated in the risk database with an intensity of the corresponding phenomenon. The intensity may take a first value when the associated weather risk is zero, and a second value when the associated weather risk is not zero.

For each mesh, the risk database lists at least a potential risk and its degree of intensity.

For example, each mesh is associated with each listed weather risk. However, each risk is associated with the first value if the risk is absent from the mesh in question, or with the second value if the risk is present in said mesh. For example, the first value of a risk may be equal to zero, while the second value is equal to one.

Furthermore, said meteorological data may comprise at least one kind of meteorological data selected from a list comprising at least one of the following kinds of data: ground air temperature; ground air pressure; ground humidity; dew point; ground visibility distance; wind direction and intensity; the presence of precipitation; the presence of a thunderstorm; the presence of turbulence; and the presence of fog.

This meteorological data may come from measurements made by sensors on board the aircraft, and from the usual aviation messages and aviation weather maps, etc. . . . .

Thus, during the weather determination step, the meteorological data is extracted at least in part from a meteorological message transmitted to the aircraft.

During the weather determination step, the method makes provision for extracting weather data from the aviation messages, such as ground temperature or dew point or humidity, for example. This weather data is also associated with the corresponding meshes, i.e. with the meshes corresponding to the geographical position to which these weather parameters relate.

The weather determination step takes place on the ground and/or in flight, as soon as new weather information is available.

It can happen that some meteorological data is not available for a portion of the geographical area in which a mission is to take place. Under such circumstances, certain meshes will be associated with no meteorological data.

In order to associate geographical data with meteorological data, a combined database may be prepared prior to the analysis step, the combined database comprising, for each mesh, both geographical data and meteorological data, and for at least one mesh at least one weather risk and a value of at least one combined parameter.

The database is said to be a "combined" database since this database combines geographical and weather type information with intrinsic risk parameters and with combined parameters.

This combined database may be structured in the form of a geo-referenced grid in which each mesh contains the following information:

geographical data, and in particular the elevation of a mesh and the nature of the terrain (water, forest, field, town, . . . );

intrinsic risk parameters, in particular a risk of fog or of ice;

meteorological data for the site, in particular the temperature, pressure, humidity, wind, risk of thunderstorms, presence of atmospheric turbulence; and combined parameters.

Furthermore, the processing step and said analysis step may possibly be performed for each mesh that is associated with meteorological data.

The method processes all of the meshes that already contain instantaneous and/or forecast meteorological data. Thus, in each of these meshes, each combined parameter is defined by a function that is based mainly on logic.

Under such circumstances, each logic function may give a value equal to a first value to a combined parameter when it is possible that the terrain might potentially modify weather conditions, and may give a value equal to a second value to the combined parameter when such potential modification is not possible.

For example, for a combined parameter representing the possibility of said weather conditions being modified locally by the terrain, the logic function associated with the combined parameter gives a predetermined value to the combined parameter representative of a possible modification of the weather conditions if the following conditions are satisfied:

$$[U1<Mto1<U2] \text{ and}$$

$$[U3<Mto2<U4] \text{ and}$$

$$[Geo1<U5] \text{ and}$$

$$[Risk1=Risk2=Risk4=0]$$

where "U1" and "U2" represent predetermined temperatures; "Mto1" represents meteorological data of the ground temperature kind; "U3" and "U4" represent predetermined pressures; "Mto2" represents meteorological data of the ground pressure kind; "U5" represents a predetermined altitude; "Geo1" represents geographical data representing an altitude of the terrain; "Risk1=0" represents a fog type weather risk that is zero; "Risk2=0" represents a ground frost type weather risk that is zero; and "Risk4=0" represents a violent wind type weather risk that is zero.

This combined weather confidence parameter indicates whether the meteorological data acquired from aviation messages is or is not likely to be modified locally because of the geography of the site and known intrinsic risks. By way of example, this combined weather confidence parameter may take the value zero if at least one of the above conditions is not satisfied, and otherwise takes the value one.

By way of example, U1 may be 5° C. (degrees Celsius), and U2 may be 25° C. In addition, U3 may be 900 Pa (pascals), and U4 may be 1100 Pa. Finally, U5 may be 3000 ft (feet).

In addition, a combined parameter may represent the possibility of the weather conditions being modified locally by the terrain, and the logic function associated with the combined parameter may give a predetermined value to the combined parameter representative of a possible modification of the weather conditions if the following conditions are satisfied:

[$Mto1 < V1$] and

[$Mto3 > V2$] and

[$Geo1 > V3$] and

[$Geo2 = V4$] and

[$Risk1 = 1$]

where "V1" represents a predetermined temperature; "Mto1" represents meteorological data of the ground temperature kind; "V2" represents a predetermined humidity; "Mto3" represents meteorological data of the ground humidity kind; "V3" represents a predetermined altitude; "Geo2" represents geographical data representing a nature of the terrain; "V4" represents a nature of the forest type; and "Risk1=1" represents an identified fog type weather risk.

This combined parameter specifies the risk of fog evaluated on the basis of meteorological data weighted by knowledge of the geography of the site and of intrinsic risks. By way of example, this combined parameter may take the value zero if at least one of the above conditions is not satisfied, and otherwise it may have the value one.

By way of example, V1 may be 8° C. Furthermore, V2 may be 60% (percent). Finally, V3 may be equal to 300 ft.

Furthermore, a combined parameter may represent the possibility of said weather conditions being modified locally by the terrain, said logic function associated with the combined parameter may give a predetermined value to the combined parameter representative of a possible modification of the weather conditions if the following conditions are satisfied:

[$Mto3 < W1$] and

[$Geo2 = W2$] and

[$Risk3 = 1$]

where "W1" represents a predetermined humidity; "Mto3" represents meteorological data of the ground humidity kind; "Geo2" represents geographical data representing a nature of the terrain; "W2" represents a sand type nature; and "Risk3=1" represents an identified weather risk of the sand-laden air type.

This combined parameter specifies the risk of "brown-out", which is evaluated on the basis of knowledge about meteorological data weighted by knowledge about the geography of the site and about intrinsic risks. By way of example, this combined parameter may take the value zero if at least one of the above conditions is not satisfied, and otherwise may take the value one.

By way of example, "W1" may be 20%.

Furthermore, with the path followed by the aircraft passing over meshes said to be "overflown" meshes for convenience, each mesh adjacent to an overflown mesh, said to be a "neighboring" mesh for convenience is examined, and a potential weather danger may be detected for an overflown mesh if at least two neighboring meshes adjacent to the overflown mesh presents a combined parameter having a value representative of the presence of a said potential modification.

The analysis step then consists in considering all of the information relating to meshes close to the current position of the aircraft and to the path that is to be followed, in order to identify any potential risk due to the "official" weather forecast resulting from the meteorological data or from the combined forecast defined by the combined parameters.

Meshes lying around the position of the aircraft and the path that is to be followed by the aircraft are studied in order to signal a danger, if any.

In the absence of a local weather danger for a mesh, the usual meteorological data may optionally be displayed for this mesh.

Furthermore, said meteorological data may comprise current data relating to a given instant and forecast data corresponding to a future moment that will be reached at the end of a given length of time from said given instant. For example, a body may issue a message at 12 noon giving meteorological data relating to the current weather at 12 noon together with meteorological data relating to the weather forecast for 12:30.

During the processing step, the current data is optionally given to all meshes that are to be reached by the aircraft before said future moment, and the forecast data is given to all of the meshes that are to be reached by the aircraft as from said future moment.

Advantageously, weather forecasts can thus be taken into account.

In addition to a method, the invention provides a piloting assistance device for an aircraft in order to detect and signal local weather risks associated with the overflown terrain.

The piloting assistance device comprises an on-board computer applying said above-described method, the computer communicating with the terrain database and with the risk database, and also with a system for determining the meteorological data and with a navigation system providing the position of the aircraft in order to perform the processing and analysis steps, said piloting assistance device having a signaling system connected to the computer for displaying information relating to a detected local weather danger.

The navigation system may potentially be used to prepare a path that is to be followed.

The invention also provides an aircraft including a piloting assistance device of the above-described type.

BRIEF DESCRIPTION OF THE SEVERAL VIEWS OF THE DRAWINGS

The invention and its advantages appear in greater detail from the context of the following description of implementations given by way of illustration and with reference to the accompanying figures, in which:

FIG. 1 is a diagram illustrating an aircraft of the invention;

FIG. 2 is a flow chart illustrating the method of the invention;

FIG. 3 is a diagram illustrating terrain that is represented in the form of a geo-referenced grid; and FIG. 4 is a diagram illustrating a signaling step.

DETAILED DESCRIPTION OF THE INVENTION

Elements present in more than one of the figures are given the same references in each of them.

FIG. 1 shows an aircraft 1 of the invention. This aircraft may comprise a rotor contributing to providing the aircraft with lift and/or propulsion. In particular, the aircraft may be a rotorcraft suitable for flying at low altitude close to the ground.

The aircraft 1 is provided with a piloting assistance device 2 that serves to assist a pilot, in particular while flying at low altitude. The piloting assistance device 2 seeks in particular to signal a local weather phenomenon generated as a function of the weather conditions in the zone and the specific features of terrain.

The piloting assistance device comprises a processor unit 5 including a computer 10. The computer 10 may comprise at least one electronic circuit having at least one processor 11. Under such circumstances, the computer can execute instructions stored in a storage space 16 of a memory unit 15 of the processor unit in order to apply the method of the invention.

For this purpose, the computer 10 is connected to a plurality of databases 20, e.g. stored in the memory unit 15.

In particular, the computer 10 has access to data from a terrain database 21 and from a weather risk database 22.

In addition, the computer 10 has access to a combined database 23. The computer can construct the combined database and access the data of this combined database 23.

Furthermore, the computer 10 communicates with a system for determining said meteorological data 45. Conventionally, such a system receives meteorological messages or maps suitable for use by the computer 10. The meteorological data is said to be "official" when it is transmitted by authorized meteorological organizations and it relates to the general weather of a region, but not to phenomena that can occur locally. By way of example, the presence of wind may be signaled for a region, without it being specified whether the wind is going to generate turbulence locally.

Furthermore, the computer 10 may communicate with a navigation system 30.

Such a navigation system 30 may comprise a positioning device 35 known under the acronym GPS for global positioning system.

The navigation system 30 may also have a conventional navigation device 36 for preparing a path to be followed. For example, such a navigation device 36 may comprise a screen 37, and a plurality of interfaces 38 that can be operated by a person in order to establish the path to be followed.

Finally, the computer communicates with a signaling system 40 suitable for signaling a local weather danger. For example, the signaling system has a screen and it may form part of the same equipment as the navigation device 36.

The piloting assistance device 2 serves to perform the piloting assistance method illustrated in FIG. 2.

With reference to FIG. 2, the method comprises an initialization step STP1 that may be performed at least in part on the ground prior to a flight.

Thus, during a step STP11 of preparing a terrain database in the initialization step STP1, the terrain database 21 is prepared and stored in the aircraft.

With reference to FIG. 3, this terrain database 21 may represent the terrain 100 by virtually subdividing it into a plurality of meshes 110.

The meshes 110 are geo-referenced. Under such circumstances, for each mesh 110, the database stores the geographical coordinates 3 of the mesh.

In addition, various kinds of geographical data geo1, geo2 are also stored for each mesh. In particular, the geographical data geo1 provides an altitude for the associated mesh, e.g. the altitude of the highest point in the mesh.

Furthermore, the geographical data geo2 relates to the nature of the terrain in the mesh in question. The nature of the terrain is representative of the composition of the ground in the mesh. Thus, this nature may possibly be selected from a list comprising at least the following natures: urban, asphalt, countryside, forest, sand, water, rock.

Furthermore, in a step STP12 of preparing a risk database during the initialization step STP1, the risk database 22 is prepared and stored in the aircraft.

For at least one mesh, a person stores a weather risk risq representing a local weather phenomenon that might occur in the mesh because of the geographical data of that mesh. This risk database 22 is shared between a plurality of users in order to be enriched by the users. The data in the risk database is thus established on the basis of experience.

By default, each mesh may mention the absence of any such weather risk in that mesh.

In particular, each weather risk risq may optionally be selected from a list of phenomena comprising at least: a fog risk RISK1; a ground frost risk RISK2; a risk of air laden with solid particles RISK3; and a risk of atmospheric turbulence RISK4.

Each weather risk is associated in the risk database with an intensity for the corresponding phenomenon. For example, this intensity may have a first value when the associated weather risk is zero, and a second value when the associated weather risk is not zero.

By way of illustration, if no user has identified a fog risk in a mesh, then the value zero may be given to the variable RISK1 that represents this fog risk. Conversely, if a user has identified the presence of fog in a mesh, then the second value may be given to the variable RISK1 representing this fog risk.

During the initialization step STP1, the computer can initialize a combined database 23. At this stage, the combined database contains the meshes present in the terrain database. In addition, for each mesh, the combined database has the geographical data of the mesh as provided by the terrain database 21 together with the weather risk data provided by the risk database 22.

When the aircraft receives meteorological data, a weather determination step STP2 is undertaken automatically by the computer.

The computer acquires meteorological data MTo relating to current weather conditions and/or forecast weather conditions by requesting said meteorological data from the determination system 45.

The meteorological data MTo comprises data of at least one kind for selecting in a list comprising at least one of the following kinds of data: ground air temperature MTo1, e.g. expressed in degrees Celsius; ground air pressure MTo2, e.g. expressed in pascals; ground humidity MTo3, e.g. expressed as a percentage; dew point temperature MTo4, e.g. expressed in degrees Celsius; ground visibility MTo5, e.g. expressed in meters; wind direction and intensity MTo7, e.g. expressed in meters per second; the presence of precipitation MTo8; the presence of thunderstorms MTo9; the presence of atmospheric turbulence MTo6; and the presence of fog MTo10.

A weather phenomenon that is ongoing is associated with a value equal to one, whereas the value zero is given to a weather phenomenon that is absent. For example, in the presence of fog, the variable MTo10 takes the value one.

The meteorological data may optionally be extracted at least in part from a meteorological message transmitted to the aircraft. The computer decodes the transmitted messages to extract the meteorological data therefrom and transform it into a suitable format.

The computer can then enrich the combined database 23 by associating each mesh with meteorological data relating to that mesh. For each mesh, the combined database then comprises the geographical data of the mesh as provided by the terrain database 21, the data relating to weather risks as provided by the risk database 22, and the corresponding meteorological data provided by the meteorological database 23.

During a processing step STP3, the computer determines the value of at least one combined parameter COMB. A combined parameter COMB represents the local influence of the terrain on the weather, i.e. in each mesh under examination. In order to determine the value of a combined parameter of a mesh, the computer applies a logic function that gives a predetermined value to the combined parameter as a function of geographical data and also of weather risks and weather conditions stored for the mesh.

By way of example, a logic function gives a predetermined value equal to one to a combined parameter meaning that it is possible that weather conditions are going to be modified if the following conditions are satisfied:

[$U1<Mto1<U2$] and

[$U3<Mto2<U4$] and

[$Geo1<U5$] and

[$Risk1=Risk2=Risk4=0$]

where "U1" and "U2" represent predetermined temperatures; "Mto1" represents meteorological data of the ground temperature kind; "U3" and "U4" represent predetermined pressures; "Mto2" represents meteorological data of the ground pressure kind; "U5" represents a predetermined altitude; "Geo1" represents geographical data representing an altitude of the terrain; "Risk1=0" represents a fog type weather risk that is zero; "Risk2=0" represents a ground frost type weather risk that is zero; and "Risk4=0" represents a violent wind type weather risk that is zero.

Another logic function gives a predetermined value, e.g. equal to one, to a combined parameter that means that fog might be present if the following conditions are satisfied:

[$Mto1<V1$] and

[$Mto3>V2$] and

[$Geo1>V3$] and

[$Geo2=V4$] and

[$Risk1=1$]

where "V1" represents a predetermined temperature; "Mto1" represents meteorological data of the ground temperature kind; "V2" represents a predetermined humidity; "Mto3" represents meteorological data of the ground humidity kind; "V3" represents a predetermined altitude; "Geo2" represents geographical data representing a nature of the terrain; "V4" represents a nature of the forest type; and "Risk1=1" represents an identified fog type weather risk.

A logic function associated with this combined parameter gives a predetermined value, e.g. equal to one, to a combined parameter meaning there is a possibility of air laden with solid particles if the following conditions are satisfied:

[$Mto3<W1$] and

[$Geo2=W2$] and

[$Risk3=1$]

where "W1" represents a predetermined humidity; "Mto3" represents meteorological data of the ground humidity kind; "Geo2" represents geographical data representing a nature of the terrain; "W2" represents a sand type nature; and "Risk3=1" represents an identified weather risk of the sand-laden air type.

The computer can then enrich the combined database 23 by associating each mesh with the value of each combined parameter. For each mesh, the combined database then has the geographical data of the mesh as supplied by the terrain database 21, the data relating to weather risks as supplied by the risk database 22, and the corresponding meteorological data and the value of each combined parameter.

The processing step may be performed each time the meteorological data is updated.

Furthermore, the meteorological data may include current meteorological data and forecast data. Optionally, the current data is used for all of the meshes that might be reached by the aircraft before said forecast moments, with the forecast data being used for all of the meshes that are going to be reached by the aircraft as from said forecast moments.

During an analysis step STP4, the computer acts in flight to determine the possible presence of a potential local weather danger at least around the aircraft 1 as a function of values of the said combined parameters. The analysis step is performed at a flight processing frequency.

With reference to FIG. 3, the aircraft is to be found at each calculation instant over a current overflown mesh 101. Furthermore, the path 200 to be followed by the aircraft goes over meshes that are also referred to as "overflown meshes". Each mesh adjacent to an overflown mesh is said to be "neighboring" mesh 102.

During the analysis step, the computer detects a potential weather danger for an overflown mesh when at least two meshes adjacent to the overflown mesh present a combined parameter having a value representative of a said potential weather modification.

For example, two meshes 103 adjacent to the overflown mesh 101 over which the aircraft is located may each be associated with a combined parameter representative of the possible presence of fog that is equal to one. The computer then considers that the overflown mesh should be associated with a fog type weather danger.

Optionally, the processing step STP3 and the analysis step STP4 are performed for each mesh that is associated with meteorological data.

With reference to FIG. 2, if a weather danger is detected, the computer performs a signaling step STP5.

During this signaling step STP5, at least one kind of information relating to a local weather danger detected during the analysis step STP4 is displayed on the signaling system 40.

The computer prepares the information that is to be transmitted to the signaling system 40 in order to give the crew a detailed weather situation.

In particular, and with reference to FIG. 4, in the example of FIG. 3, the computer causes a horizontal representation of the terrain to be displayed, which representation includes a lake 300, for example.

Since the analysis step has led to a local risk of fog being detected, the computer causes a zone 301 around the lake to be displayed in such a manner as to signal this local risk of fog.

In addition, and with reference to FIG. 2, the computer performs a verification step STP6. During this verification step STP6, the computer determines whether the meteorological data is up to date.

If not, the computer determines the new position of the aircraft during an updating step STP7 and then performs the analysis step STP4.

In contrast, if the meteorological data is up to date, the computer performs the weather determination step STP2.

Naturally, the present invention may be subjected to numerous variants as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A piloting assistance method for detecting and signaling local weather risks associated with a terrain overflown by an aircraft, the overflown terrain being subdivided in a geo-referenced grid that is provided with a plurality of individual meshes, wherein the method comprises the following steps:
    prior to flight, a step of preparing an on-board terrain database by storing in the terrain database a plurality of kinds of geographical data providing each mesh with the altitude of the terrain and providing at least one mesh with a nature of the terrain;
    prior to flight, a step of preparing an on-board risk database by storing in the risk database at least one local weather risk for at least one mesh, each weather risk representing a local weather phenomenon that might occur as a function of geographical data of the corresponding mesh;
    a weather determination step of acquiring meteorological data relating to current and/or forecast weather conditions for at least one mesh;
    a processing step, performed after the weather determination step, of determining a value of at least one "combined" parameter for at least one mesh, the combined parameter representing a potential modification of the weather conditions due to the terrain, each value of a combined parameter being obtained by applying a logic function giving the value of the combined parameter for a mesh as a function of the geographical data and also of the weather risks and the meteorological data associated with the mesh;
    in flight, an analysis step of detecting the presence of a potential local weather danger at least around the aircraft as a function of the values of the combined parameters; and
    a signaling step of displaying information relating to a local weather danger detected during the analysis step.

2. The piloting assistance method according to claim 1, wherein the nature of a terrain is selected from a list comprising at least one of the following natures: urban, asphalt, countryside, forest, sand, water, rock.

3. The piloting assistance method according to claim 1, wherein the risk database is shared between a plurality of users in order to be updated by the users.

4. The piloting assistance method according to claim 1, wherein each weather risk is selected from a list of phenomena comprising at least: a fog risk; a risk of air laden with solid particles; a risk of ground frost; and a risk of atmospheric turbulence.

5. The piloting assistance method according to claim 1, wherein each weather risk is associated in the risk database with an intensity of the corresponding phenomenon.

6. The piloting assistance method according to claim 5, wherein the intensity takes a first value when the associated weather risk is zero, and a second value when the associated weather risk is not zero.

7. The piloting assistance method according to claim 1, wherein the meteorological data comprises at least one kind of meteorological data selected from a list comprising at least one of the following kinds of data: ground air temperature; ground air pressure; ground humidity; dew point; ground visibility distance; wind direction and intensity; the presence of precipitation; the presence of a thunderstorm; the presence of atmospheric turbulence; and the presence of fog.

8. The piloting assistance method according to claim 1, wherein during the weather determination step, the meteorological data is extracted at least in part from a meteorological message transmitted to the aircraft.

9. The piloting assistance method according to claim 1, wherein prior to the analysis step, a combined database is prepared, the combined database comprising, for each mesh, both geographical data and meteorological data, and for at least one mesh at least one weather risk and a value of at least one combined parameter.

10. The piloting assistance method according to claim 1, wherein the processing step and the analysis step are performed for each mesh that is associated with meteorological data.

11. The piloting assistance method according to claim 1, wherein during the analysis step, while the path followed by the aircraft passes over the "overflown" meshes, each "neighboring" mesh adjacent to an overflown mesh is examined, with a potential weather danger being detected for an overflown mesh if at least two neighboring meshes adjacent to the overflown mesh present a combined parameter having a value representative of the presence of a potential modification.

12. The piloting assistance method according to claim 1, wherein the logic function gives a combined parameter a value equal to a first value when a potential modification is possible, and gives the combined parameter a value equal to a second value when the potential modification is not possible.

13. The piloting assistance method according to claim 1, wherein the meteorological data comprises current data relating to a given instant and forecast data corresponding to a future moment that will be reached at the end of a given length of time from the given instant, and during the processing step the current data is given to all meshes that are to be reached by the aircraft before the future moment, and the forecast data is given to all of the meshes that are to be reached by the aircraft as from the future moment.

14. The piloting assistance method according to claim 1, wherein for a combined parameter representing the possibility of the weather conditions being modified locally by the terrain, the logic function associated with the combined parameter gives a predetermined value to the combined parameter representative of a possible modification of the weather conditions if the following conditions are satisfied:

[$U1<Mto1<U2$] and

[$U3<Mto2<U4$] and

[$Geo1<U5$] and

[$Risk1=Risk2=Risk4=0$]

where "U1" and "U2" represent predetermined temperatures; "Mto1" represents meteorological data of the ground temperature kind; "U3" and "U4" represent predetermined pressures; "Mto2" represents meteorological data of the ground pressure kind; "U5" represents a predetermined altitude; "Geo1" represents geographical data representing an altitude of the terrain; "Risk1=0" represents a fog type weather risk that is zero; "Risk2=0" represents a ground frost type weather risk that is zero; and "Risk4=0" represents a violent wind type weather risk that is zero.

15. The piloting assistance method according to claim 1, wherein for a combined parameter representing the possibility of the weather conditions being modified locally by the terrain, the logic function associated with the combined parameter gives a predetermined value to the combined parameter representative of a possible modification of the weather conditions if the following conditions are satisfied:

[$Mto1<V1$] and

[$Mto3>V2$] and

[$Geo1>V3$] and

[$Geo2=V4$] and

[$Risk1=1$]

where "V1" represents a predetermined temperature; "Mto1" represents meteorological data of the ground temperature kind; "V2" represents a predetermined humidity; "Mto3" represents meteorological data of the ground humidity kind; "V3" represents a predetermined altitude; "Geo2" represents geographical data representing a nature of the terrain; "V4" represents a nature of the forest type; and "Risk1=1" represents an identified fog type weather risk, "Geo1" represents geographical data representing an altitude of the terrain.

16. The piloting assistance method according to claim 1, wherein for a combined parameter representing the possibility of the weather conditions being modified locally by the terrain, the logic function associated with the combined parameter gives a predetermined value to the combined parameter representative of a possible modification of the weather conditions if the following conditions are satisfied:

[$Mto3<W1$] and

[$Geo2=W2$] and

[$Risk3=1$]

where "W1" represents a predetermined humidity; "Mto3" represents meteorological data of the ground humidity kind; "Geo2" represents geographical data representing a nature of the terrain; "W2" represents a sand type nature; and "Risk3=1" represents an identified weather risk of the sand-laden air type.

17. A piloting assistance device for an aircraft to detect and signal local weather risks associated with an overflown terrain, the overflown terrain subdivided in a geo-referenced grid with a plurality of individual meshes, the piloting assistance device comprising:
a terrain database configured to store a plurality of kinds of geographical data providing each mesh with an altitude of the terrain and providing at least one mesh with a nature of the terrain and a risk database configured to store at least one local weather risk for at least one mesh, each weather risk representing a local weather phenomenon that might occur as a function of geographical data of the corresponding mesh;
a computer in communication with the terrain database and the risk database, the computer configured to acquire meteorological data relating to current and/or forecast weather conditions for at least one mesh from a meteorological data source to determine a value of at least one "combined" parameter for at least one mesh, the combined parameter representing a potential modification of the weather conditions due to the terrain, wherein to determine each value of a combined parameter the computer is further configured to apply a logic function giving the value of the combined parameter for a mesh as a function of the geographical data, the weather risks, and the meteorological data associated with the mesh;
the computer further configured to detect while the aircraft is in flight the presence of a potential local weather danger at least around the aircraft as a function of the values of the combined parameters; and
a signaling system in communication with the computer, the signaling system configured to display information relating to a local weather danger detected by the computer.

18. An aircraft, including the piloting assistance device according to claim 17.

19. A piloting assistance method for detecting and signaling local weather risks associated with a terrain overflown by an aircraft, the overflown terrain subdivided into a geo-referenced grid with a plurality of individual meshes, the method comprising:
storing in an onboard terrain database a plurality of kinds of geographical data providing each mesh with an altitude of the terrain and providing at least one mesh with a nature of the terrain;
storing in an onboard risk database at least one local weather risk for at least one mesh, each weather risk representing a local weather phenomenon that might occur as a function of geographical data of the corresponding mesh;
acquiring, by an onboard computer in communication with the terrain database and the risk database, meteorological data relating to current and/or forecasted weather conditions for at least one mesh;
after acquiring the meteorological data, determining by the computer a value of at least one "combined" parameter for at least one mesh, the combined parameter representing a potential modification of the weather conditions due to the terrain, each value of a combined parameter for a mesh determined by applying a logic function giving the value of the combined parameter for the mesh as a function of the geographical data, the weather risk, and the meteorological data associated with the mesh;

detecting by the computer a presence of a potential local weather danger at least around the aircraft as a function of the values of the combined parameters; and displaying information relating to a local weather danger detected by the computer.

20. The piloting assistance method of claim 19, wherein each weather risk is associated in the risk database with an intensity of the corresponding phenomenon, wherein the intensity has a first value when the associated weather risk is zero, and the intensity has a second value when the associated weather risk is not zero.

* * * * *